United States Patent
Zhu et al.

(10) Patent No.: US 10,372,547 B1
(45) Date of Patent: Aug. 6, 2019

(54) RECOVERY-CHAIN BASED RETENTION FOR MULTI-TIER DATA STORAGE AUTO MIGRATION SYSTEM

(71) Applicant: Veritas Technologies LLC, Mountain View, CA (US)

(72) Inventors: Baishen Zhu, Sanford, FL (US); William D. Waldrum, Paso Robles, CA (US); Srineet Sridharan, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 718 days.

(21) Appl. No.: 14/982,360

(22) Filed: Dec. 29, 2015

(51) Int. Cl.
 *G06F 17/30* (2006.01)
 *G06F 11/14* (2006.01)

(52) U.S. Cl.
 CPC ...... *G06F 11/1448* (2013.01); *G06F 11/1464* (2013.01); *G06F 2201/80* (2013.01)

(58) Field of Classification Search
 CPC ............. G06F 11/1448; G06F 11/1464; G06F 2201/80
 See application file for complete search history.

(56) References Cited

U.S. PATENT DOCUMENTS

| | | | |
|---|---|---|---|
| 5,537,585 A | 7/1996 | Blickenstaff et al. | |
| 5,644,766 A | 7/1997 | Coy et al. | |
| 5,708,812 A | 1/1998 | Dyke et al. | |
| 5,873,103 A | 2/1999 | Trede et al. | |
| 5,953,729 A | 9/1999 | Cabrera et al. | |
| 6,023,709 A | 2/2000 | Anglin et al. | |
| 6,029,179 A | 2/2000 | Kishi | |
| 6,067,599 A | 5/2000 | Kishi et al. | |
| 6,119,131 A | 9/2000 | Cabrera et al. | |
| 6,189,016 B1 | 2/2001 | Cabrera et al. | |
| 6,269,382 B1 | 7/2001 | Cabrera et al. | |
| 7,415,488 B1 | 8/2008 | Muth et al. | |
| 7,676,704 B2 | 3/2010 | Hong et al. | |

(Continued)

OTHER PUBLICATIONS

"System Management: Data Storage Management (XDSM) API", CAE Specification, Technical Report, published by The Open Group, Feb. 1997, 198 pages.

(Continued)

*Primary Examiner* — Tyler J Torgrimson
(74) *Attorney, Agent, or Firm* — Meyertons Hood Kivlin Kowert and Goetzel PC; Rory D. Rankin

(57) ABSTRACT

A system and method for defining retention and lifecycle policies for data backups. A media server supports a recovery-chain-based retention policy for data lifecycle management (DLM) on a first tier of a multi-tier storage system. A recovery chain includes full backup data and at least one partial backup data. The recovery chain is maintained on the first tier until it is expired due to a new full backup operation being performed and corresponding full backup data being stored on the first tier. Based on another retention policy, the media server identifies given backup data corresponding to a recovery chain that qualifies for migration from the first tier. However, the media server determines the recovery chain includes the given backup data and other backup data that does not yet qualify for migration. In response, the media server maintains a copy of the given backup data on the first tier.

14 Claims, 4 Drawing Sheets

(56) References Cited

U.S. PATENT DOCUMENTS 9,235,579 B1    1/2016  Suarez
9,235,606 B1 *  1/2016  Mooney ............ G06F 17/30073

OTHER PUBLICATIONS

Suarez, et al., U.S. Appl. No. 11/473,813, entitled "Computer system employing an adaptive archival process", filed Jun. 23, 2006, 39 pages.

* cited by examiner

RECOVERY-CHAIN BASED RETENTION FOR MULTI-TIER DATA STORAGE AUTO MIGRATION SYSTEM

BACKGROUND OF THE INVENTION

Field of the Invention

This invention relates to the field of computer processing and, more particularly, to retention and lifecycle policies for data backups.

Description of the Related Art

As computer memory storage and data bandwidth increase, so does the amount and complexity of data that business and industry manage each day. A large portion of the data that may be managed in an enterprise involves content managed for a company or workgroup. Such information may include electronic documents, announcements, tasks, discussion topics, and so forth. Depending on the business value of the information, access to certain information may be secure and private while other information may have wider or even public access.

Because the various examples of stored data may frequently contain crucial information, the contents of information servers and end-user systems may be backed up to a backup storage to prevent loss of data. In such a case, the dedicated server and storage subsystem may include a backup system. However, a target backup device for the backup system typically includes one or more of a deduplication device, a tape device or Cloud-based storage. Each of these choices relatively long-term solutions, but also may consume time and network bandwidth to implement. For example, deduplication is used to reduce storage space. However, performing a scheduled backup, even an incremental backup, on an end-user laptop via a network, consumes time to scan files and detect changed files. The scanning and detecting of files consumes a large amount of time prior to using a de-duplication or other method.

In addition to consuming a large amount of time in performing backups, administering and supporting an information technology (IT) infrastructure on a large number of end-user systems presents a significant challenge. An IT administrator may develop a management system for data backup and data protection; data recovery, restore, and restart; archiving and long-term retention; and day-to-day processes and procedures necessary to manage a storage architecture. This management system, which may be referred to as a data lifecycle management (DLM), refers to a set of strategies for administering storage systems on computing devices. Operational aspects of DLM include applying certain retention policies to the effective management of information throughout its useful life.

The utilization of DLM allows a user to automatically migrate a backup image from one storage tier to another. Current methods of migrating data from one tier to another are typically time based. In such cases, a particular backup image that reached a certain age may be moved to a next tier. While such an approach may have certain benefits, such an approach may also have negative, unintended, side effects. For example, it is often desirable to restore backup data for various purposes. In order to do so, a backup corresponding to the desired period of time is identified and accessed on a given tier for restoration purposes. However, if a portion of the data needed to complete the restore operation has migrated to another tier as part of the lifecycle policy, then the restore operation is slowed down and complicated by the need to access one or more additional data storage tiers.

In view of the above, improved systems and methods for defining retention and lifecycle policies for data backups are desired.

SUMMARY OF THE INVENTION

Systems and methods for defining retention and lifecycle policies for data backups are contemplated. In various embodiments, a computing system includes a media server coupled to a first-tier of a multi-tier storage system and at least one client computer. The client computer generates data for one or more data images to be backed up in the multi-tier storage system. The media server manages the data generated by the client computer as part of a lifecycle policy for one or more data images corresponding to the generated data. In some embodiments, the first tier of the multi-tier storage system includes relatively high-performance storage, such as solid-state drives (SSDs) or other. The second tier of the multi-tier storage system includes relatively low-performance storage that consumes an appreciable amount of time and network bandwidth to implement storage. Examples of the second tier may include deduplication storage, tape storage, Cloud-based storage, and so forth.

In some embodiments, the media server uses a time-based retention policy for data lifecycle management (DLM) of data images stored on the first tier. Additionally, the media server may use a capacity-based retention policy or other retention policies for DLM on the first tier. In addition to these retention policies, the media server may also support a recovery-chain-based retention policy for DLM on the first tier. In various embodiments, a recovery chain may include full backup data and at least one partial backup data. The recovery chain may be maintained on the first tier until it is expired due to a new full backup operation being performed and corresponding full backup data being stored on the first tier.

The partial backup data within a recovery chain may be data corresponding to an incremental backup operation. In such a case, data stored on the first tier corresponding to a given incremental operation may be maintained although a new incremental backup operation is performed and corresponding new incremental backup data is stored on the first tier. Alternatively, the partial backup data within the recovery chain may be data corresponding to a differential backup operation. In such a case, data stored on the first tier corresponding to a given differential operation may be expired and removed from the first tier when a new differential backup operation is being performed and corresponding new differential backup data is being stored on the first tier.

A retention policy for DLM executed by the media server, such as the time-based retention policy, may determine given backup data on the first tier qualifies for migration from the first tier to the second tier. However, the recovery-chain-based retention policy for DLM executed by the media server may prevent the migration. The media server may determine the given backup data corresponds to a recovery chain and the recovery chain includes further backup data that does not qualify for migration at the same time. For example, the recovery chain may include full backup data and first incremental backup data, each qualifying for migration based on the time-based retention policy. However, the recovery chain may also include second incremental backup data that does not qualify for migration yet based on the time-based retention policy. Therefore, the given backup data, which includes the time-based qualifying full backup data and first incremental backup data, is maintained on the first tier and it is not migrated. Accordingly, should a subsequent restore operation for any data in the recovery chain occur, the restore operation does not include the cost of a relatively higher latency and higher network bandwidth from accessing the second tier.

These and other embodiments will be appreciated upon reference to the following description and accompanying drawings.

Figure 1:
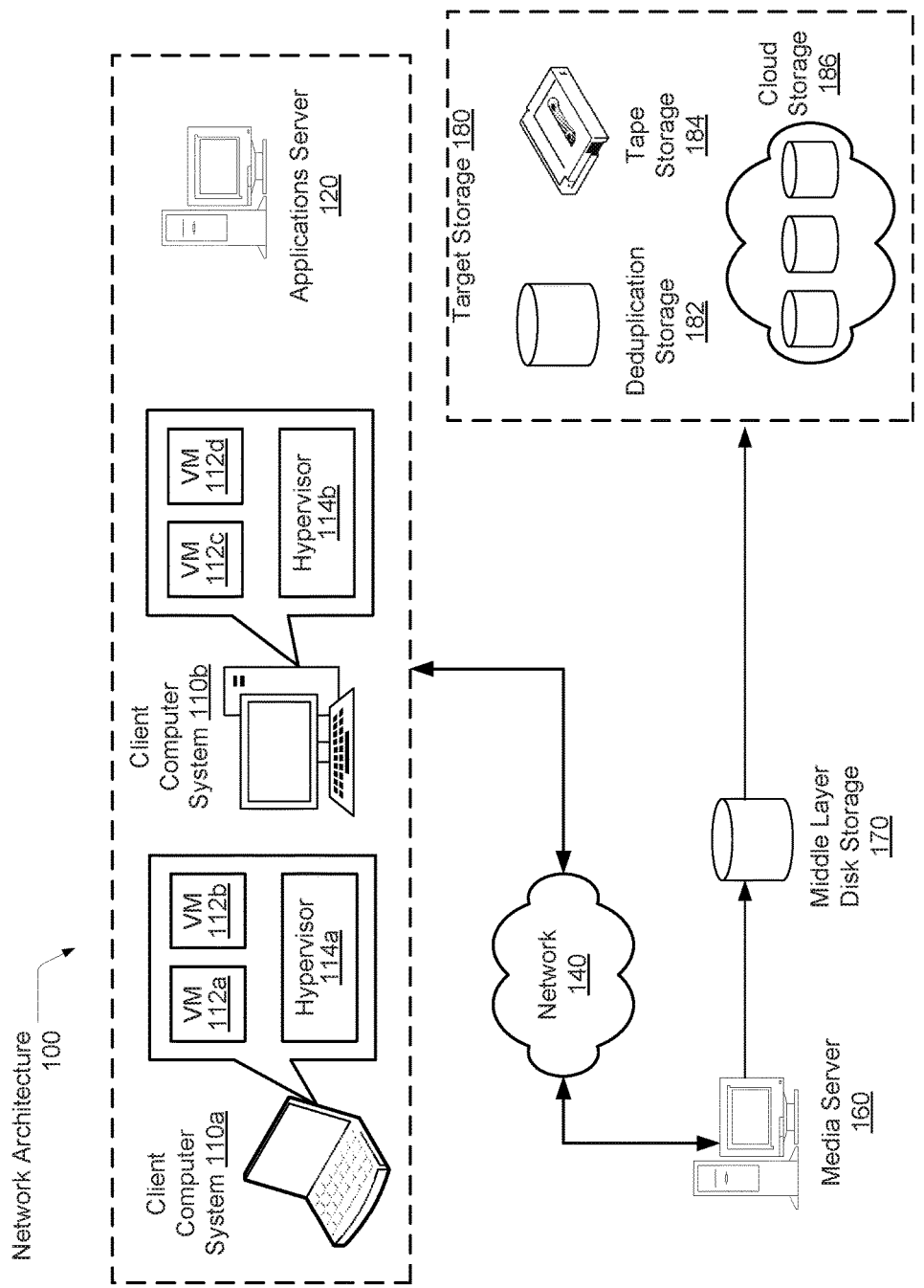
FIG. 1 is a generalized block diagram illustrating one embodiment of a network architecture.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Users, such as information technology (IT) administrators, typically select a multi-tiered storage system to manage the flow of an information system's data and associated metadata from creation and initial storage to the time when the data becomes obsolete and is deleted. This data life management (DLM) may be defined by retention policies, such as a time-based retention policy, a capacity-based retention policy, and so forth. A data image may comprise at least one or more files of information, associated metadata, and associated storage arrangement information such as directories, folders, and subfolders. A multi-tiered storage system may comprise the assignment of different data classes to different types of storage media in order to reduce total storage cost of one or more data images.

Data classes may be based on at least one of the following: predetermined levels of data protection, system performance goals, predetermined business values, and utilization frequency of the data. One or more predetermined retention policies may be utilized in software to automatically assign data and data classes to particular storage media, determine when to move data images from one storage medium to another, and when to expire or delete a given data image from a particular storage medium.

The initial data in the multi-tiered storage system may include data storage media associated with a file system used for storing data of one or more client computers. A scheduled backup operation may create a copy of a data image corresponding to the client data and metadata. A snapshot image may be created by a backup operation scheduled by an IT administrator. An early tier of the multi-tier storage system may include one or more of a deduplication storage device, recordable compact discs (CD-Rs) or tapes storage devices, or Cloud-based storage. Each of these choices may consume an appreciable amount of time and network bandwidth to receive data images. In addition, each of these choices may provide a relatively slow restore operation as the corresponding data storage media are relatively slow to access.

A user may add an intervening tier referred to as a middle layer disk storage (MLDS) between the client computers and the target storage devices, which include the deduplication storage device, the tape storage media, or the Cloud-based storage. The MLDS may include relatively high-performance storage media, such as solid-state disks (SSDs) or other. However, with time-based retention policies, capacity-based retention policies, and so forth, the user has difficulty maintaining data on the MLDS for subsequent restore operations. For example, incremental backup data for a given data image may be stored on the MLDS, but the corresponding full backup data may have already been moved to a later tier and deleted from the MLDS. Thus, a restore operation accesses each of the MLDS for the incremental backup data and a later tier for the full backup data. The access of the later tier diminishes the benefit of the relatively high-performance MLDS.

In addition to the time-based or other retention policy, a recovery-chain-based retention policy may be used for the MLDS. In various embodiments, a recovery chain may include full backup data and at least one partial backup data. The partial backup data within the recovery chain may be data corresponding to an incremental backup operation or a differential backup operation. The recovery chain may be maintained on the MLDS until it is expired due to a new full backup operation being performed and corresponding full backup data being stored on the MLDS.

A given recovery chain may begin with full backup data and further include each incremental backup data corresponding to the full backup data until the next successful full backup operation is completed on the MLDS. Alternatively, a given recovery chain may begin with full backup data and further include the latest differential backup data corresponding to the full backup data until the next successful full backup operation is completed on the MLDS. Therefore, a restore operation accesses only the MLDS and no later tier of the multi-tier storage system. The restore operation maintains the full benefit of the relatively high-performance MLDS.

Figure 2:
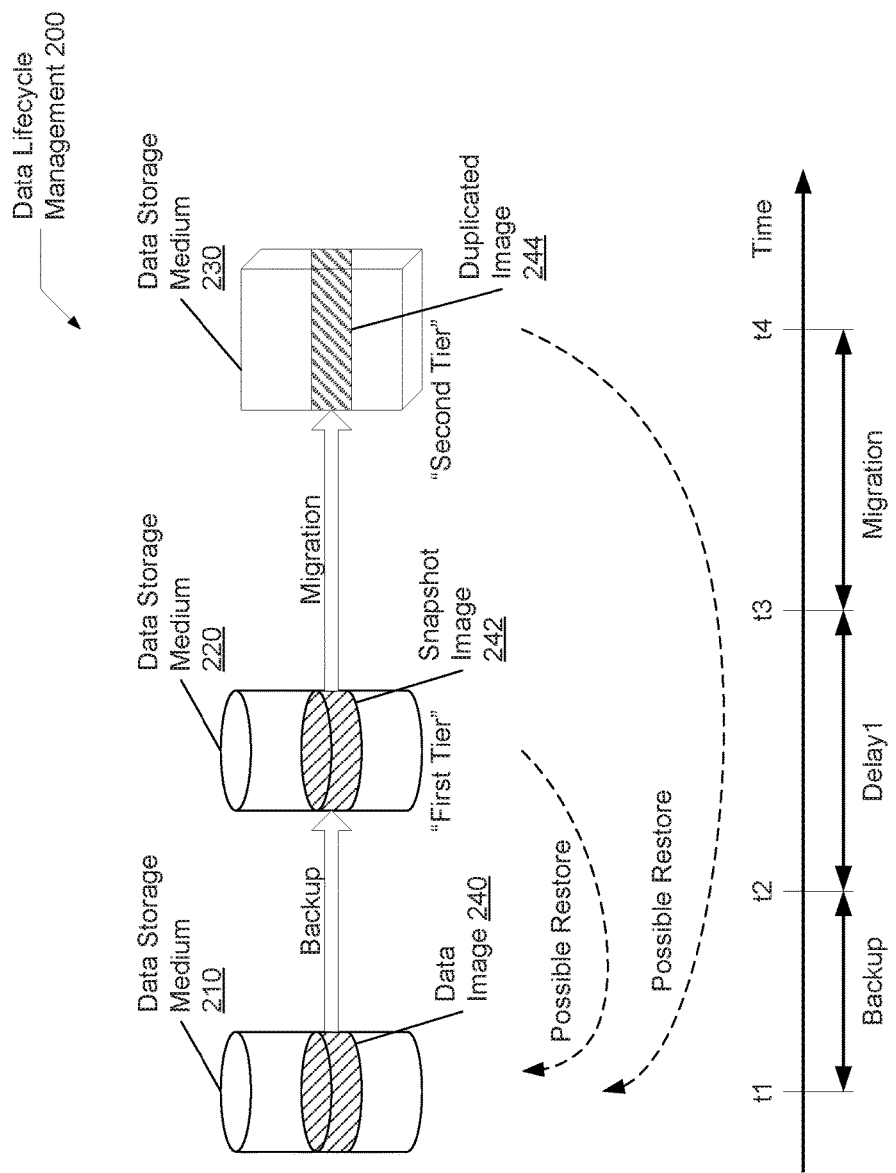
FIG. 2 is a generalized block diagram illustrating one embodiment of retention policies of a data lifecycle management (DLM).
Figure 3:
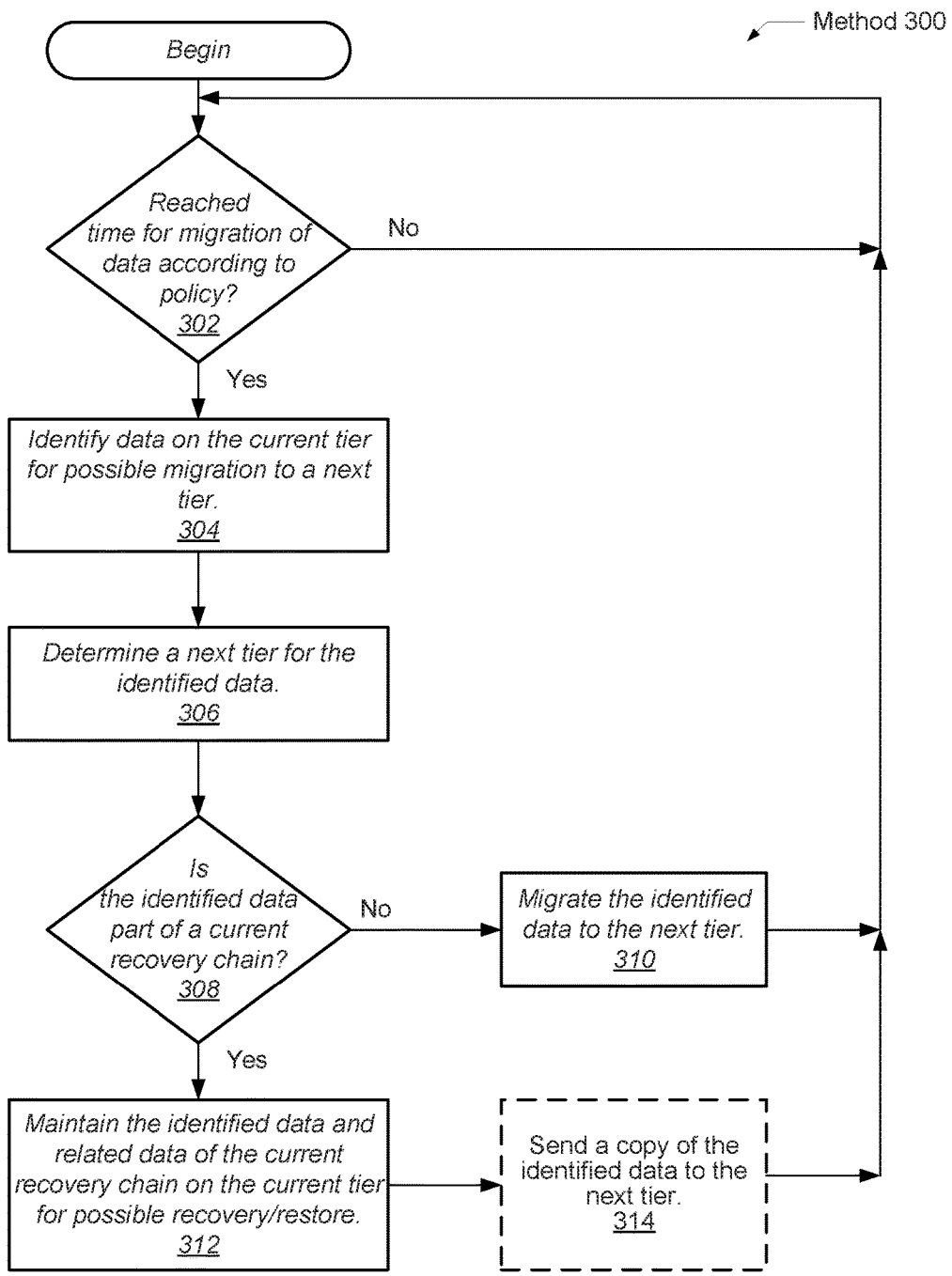
FIG. 3 is a flow diagram illustrating one embodiment of a method for defining retention and lifecycle policies for data backups.
Figure 4:
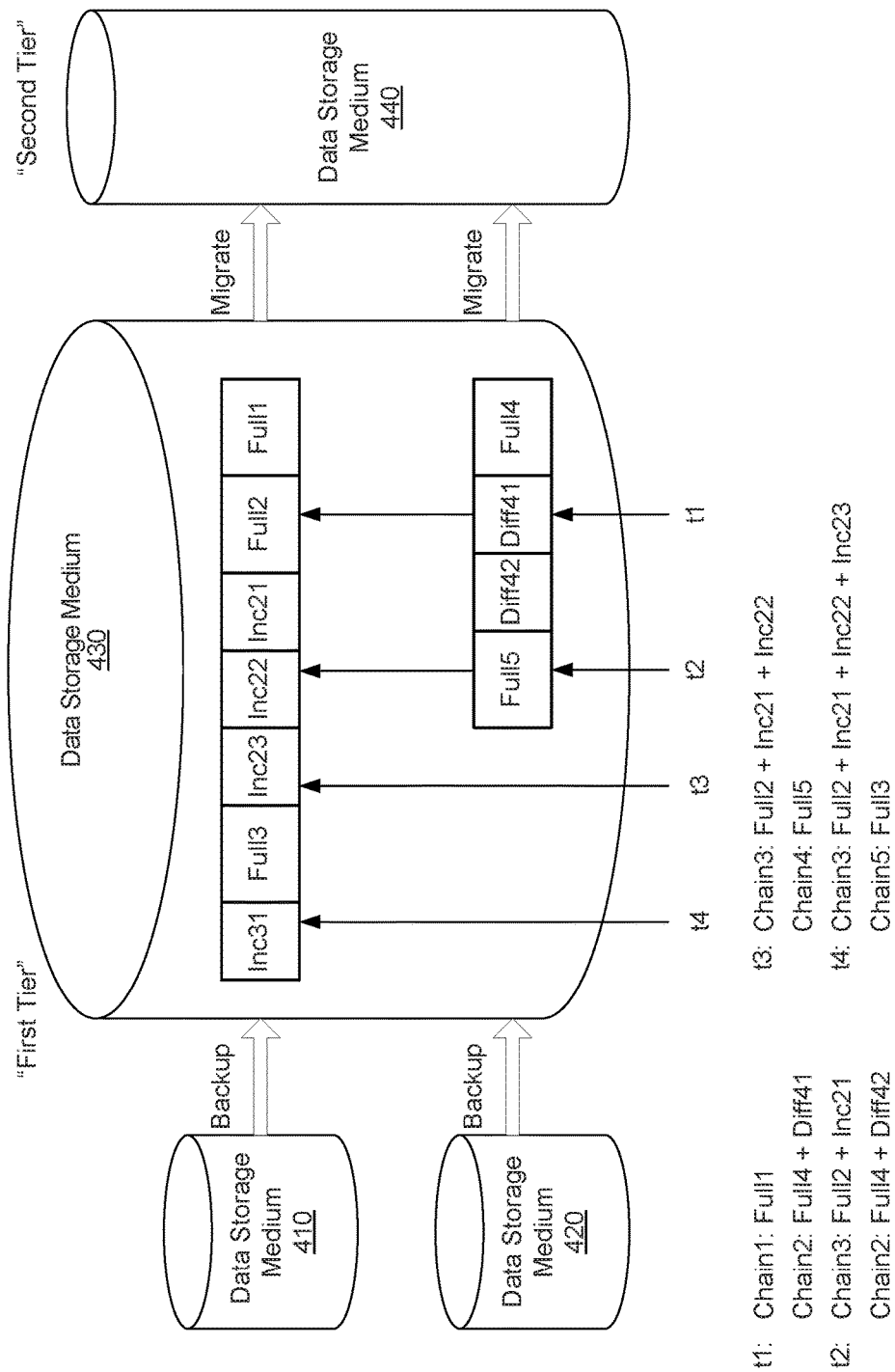
FIG. 4 is a generalized block diagram illustrating one embodiment of recovery chains stored on a data storage medium.

In the following discussion, FIG. 1 illustrates an embodiment of a network architecture for defining retention and lifecycle policies for data backups. Following, FIG. 2 to FIG. 3 illustrate examples of a data lifecycle management (DLM) for data in an enterprise using a recovery-chain-based retention policy. Finally, FIG. 4 illustrates an example of the components of backup data images when the recovery-chain-based retention policy is used.

Turning now to FIG. 1, one embodiment of a network architecture 100 is shown. In the illustrated example, network architecture 100 includes applications server 120 and client computers 110a-110b interconnected through a network 140 to one another, and to a media server 160. The middle layer disk storage (MLDS) 170 is located between the media server 160 and the target storage 180. Network 140 may include a variety of techniques including wireless connection, direct local area network (LAN) connections, wide area network (WAN) connections such as the Internet, a router, and others. Network 140 may comprise one or more LANs that may also be wireless. Network 140 may further include remote direct memory access (RDMA) hardware and/or software, transmission control protocol/internet protocol (TCP/IP) hardware and/or software, router, repeaters, switches, grids, and/or others.

In various embodiments of network architecture 100, applications server 120 is representative of any number of servers hosting business-critical applications and database servers. The client computers 110a-110b are representative of any number of stationary or mobile computers such as servers, desktop PCs, laptops, tablet computers, smartphones, etc. Although only two client computers are shown, any number of client computers may be used in the network architecture 100. Each of the client computers 110a-110b, the applications server 120 and the media server 160 may include one or more processor cores including circuitry for executing instructions according to a predefined general-purpose instruction set architecture (ISA). For example, the SPARC® instruction set architecture (ISA) may be selected. Alternatively, the x86, x86-64®, Alpha®, PowerPC®, MIPS®, PA-RISC®, or any other ISA may be selected.

Each of the client computers 110a-110b may contain one or more software applications on a corresponding memory medium, such as a hard disk, a solid-state device or other. For example, each of the client computers 110a-110b may include respective hypervisors 114a-114b to maintain one or more virtual machines (VMs) 112a-112d to provide virtual environments. In some embodiments, each of the client computers 110a-110b and the applications server 120 may include an operating environment, e.g. an operating system (OS). The OS may interface between the system hardware and the software applications. The OS may include a base OS and a virtual OS layer. In various embodiments, the provided base OS may be any of various operating systems, including MS-DOS®, MS-WINDOWS®, OS/2®, UNIX®, Linux®, Solaris® or another known operating system.

Each of the client computers 110a-110b, the applications server 120 and the media server 160 may include a file system to operate as a special-purpose database for the storage, organization, manipulation, and retrieval of data. A user may browse the directories stored on a corresponding data storage medium via the file system. One or more file servers (not shown) may also be used in the network architecture 100. The file servers may provide data storage at the file system level using file-based protocols such as Network File System (NFS) (popular on UNIX systems), SMB/CIFS (Server Message Block/Common Internet File System) (used with MS Windows systems), or AFP (used with Apple Macintosh Computers). Each of the servers 120 and 160 may include memory arranged into logical, redundant storage containers or RAID arrays (redundant arrays of inexpensive/independent disks).

The MLDS 170 may be used to store backup copies of data within the network architecture 100, whereas the target storage 180 may be used to store duplicated copies of data. As used herein the term "backup" refers to a process whereby a dataset is copied and converted to another format and stored (e.g., for possible future restoration). In one embodiment, the term "duplication" refers to a process whereby a copy of a dataset is made and stored—without a change in format. Alternatively, duplication may entail moving a dataset from one location to another without leaving a copy at the source location. In other embodiments a backup may not entail a change in format, or a duplication may entail some format change. Numerous such alternative embodiments are possible and are contemplated.

The MLDS 170 may include relatively high-performance storage media, such as solid-state disks (SSDs). The MLDS 170 may store backup copies of data generated by the client computers 110a-110b, which may be stored on applications server 120 or on a separate file server. In some embodiments, when a data image is copied on MLDS 170, the corresponding data stored on applications server 120 or other may be deleted. A time-based retention policy, a capacity-based retention policy, or other may be associated with MLDS 170. In addition, a recovery-chain-based retention policy is associated with the MLDS 170. Alternatively, only the recovery-chain-based retention policy is associated with the MLDS 170.

Backup management software, such as a backup manager, on the media server 160 may be configured to create various types of backups of data generated by the client computers 110a-110b. For example, image based, file based, or other types of backups may be created. In various embodiments, the backup manager on the media server 160 may create a backup of a specific system automatically, e.g., the backup manager on the media server 160 may be scheduled to perform regular backups of a specific system. In such a case, a scheduled regular backup may be implemented, such as a daily or weekly scheduled backup of the data generated by the client computers 110a-110b. The backup manager may create and store the backup data in a commonly known file format, such as the Virtual Hard Disk (VHD) format, the V2I format, and the Virtual Machine Disk Format (VMDK) format. The backup data may be stored on the MLDS 170.

As part of creating a backup, the backup manager on the media server 160 may also create catalog metadata associated with the corresponding files or data images. Metadata may include at least one or more of the following: a data name, data size, a fingerprint of the data, a batch number, as well as data type, version number, ownership, permissions, modification time, error code, etc. A batch number may be used to identify the particular backup operation in which an associated backup entry was created. Other forms of metadata and/or identifiers will be apparent to those of ordinary skill in the art. The catalog metadata may be usable for restore browsing, e.g., at a later time.

As shown, the target storage 180 includes a variety of data storage media. For example, the target storage 180 may include at least one or more of deduplication storage 182, tape storage 184 and Cloud-based storage 186. Deduplication storage 182 may include hard disk drives (HDDs) and any other form of data storage media coupled to a processor executing deduplication software. One method of efficiently storing data includes data deduplication, which attempts to reduce the storage of redundant data. A deduplication software application may both remove duplicate data already stored in the MLDS 170 or other storage and disallow duplicate data from being stored in the deduplication storage 182. Then only one copy of unique data may be stored, which reduces the required shared storage capacity.

Indexing of all data moved to the deduplication storage 182 may be retained should the redundant data ever be required. For example, data may be partitioned and a hash computation may be performed for each partition using any of several known hashing techniques. A corresponding hash value, or fingerprint, of data associated with a write request to the shared storage may be compared to fingerprints of data already stored in the shared storage. A match may invoke the deduplication application to discard the data of the write request, locate the already stored copy in shared storage, and create a reference or pointer to the existing stored data.

The comparisons of fingerprints may utilize a storage of fingerprints, such as in a random access memory (RAM) or otherwise. Upon arrival of data partitions of a write request to the shared storage, a fingerprint is calculated for a data partition and compared to the fingerprints stored in the RAM or other storage. This RAM or other storage may be referred to as a fingerprint index, or index. Recovering data from the deduplication storage 182 may be complicated and consume an appreciable amount of time.

The tape storage 184 may include recordable compact discs (CD-Rs), tape drives and the like. The Cloud-based storage 186 may include any variety of data storage media accessed through the Cloud. Each of the tape storage 184 and the Cloud-based storage 186 may also consume an appreciable amount of time for a recovery operation to complete.

The network architecture 100 illustrates an example of multi-tiered storage, which includes a first tier for the storage of mission-critical or recently accessed files. In the example shown, the first tier in the network architecture 100 is the MLDS 170. The tiered storage may include a second tier for the storage of classified files and other data with a decreasing value measured for business, research or other. In the example shown, the second tier in the network architecture 100 is the target storage 180.

The recovery-chain-based retention policy on the MLDS 170 may include one or more recovery chains. In various embodiments, a recovery chain may include full backup data and at least one partial backup data. The recovery chain may be maintained on the first tier, which is the MLDS 170, until it is expired due to a new full backup operation being performed and corresponding full backup data being stored on the MLDS 170.

The partial backup data within a recovery chain may be data corresponding to an incremental backup operation. In such a case, data stored on the MLDS 170 corresponding to a given incremental operation may be maintained although a new incremental backup operation is performed and corresponding new incremental backup data is stored on the MLDS 170. Alternatively, the partial backup data within the recovery chain may be data corresponding to a differential backup operation. In such a case, data stored on the MLDS 170 corresponding to a given differential operation may be expired and removed from the MLDS 170 when a new differential backup operation is being performed and corresponding new differential backup data is being stored on the MLDS 170.

In various embodiments, the media server 160 uses multiple retention policies. For example, the backup manager on the media server 160 may use both a time-based retention policy for data lifecycle management (DLM) and the recovery-chain-based retention policy. The time-based retention policy may determine given backup data on the MLDS 170 qualifies for migration from the MLDS 170 to the target storage 180. However, the recovery-chain-based retention policy for DLM executed by the backup manager on the media server 160 may prevent the migration.

The backup manager on the media server 160 may determine the given backup data corresponds to a recovery chain and the recovery chain includes further backup data that does not qualify for migration at the same time. For example, the recovery chain may include full backup data and first incremental backup data, each qualifying for migration from the MLDS 170 to the target storage 180 based on the time-based retention policy. However, the recovery chain may also include second incremental backup data that does not qualify for migration yet based on the time-based retention policy. Therefore, the given backup data, which includes the time-based qualifying full backup data and first incremental backup data, is maintained on the MLDS 170 and it is not migrated. Accordingly, should a subsequent restore operation for any data in the recovery chain occur, the restore operation does not include the cost of a relatively higher latency and higher network bandwidth from accessing the target storage 180. Rather, the restore operation may access only the relatively high-performance MLDS 170 to complete.

Each recovery chain on the MLDS 170 may be used for a granular recovery technology (GRT) cataloging process or instant virtual machine (VM) recovery. The media server 160 accessing the MLDS 170 may perform the GRT cataloging process on the media server 160 and offload the processing from the application server 120. Performing VM instant recovery with the MLDS 170 will avoid rehydration which would be used if mounting a disk from the deduplication storage 182.

Referring to FIG. 2, a generalized block diagram of one embodiment of a data lifecycle management (DLM) 200 is shown. The DLM 200 illustrates the managing of a flow of an information system's data and associated metadata from creation and initial storage to the time when the data is possibly rarely accessed. Data storage media 210-230 may represent tiered storage. Although a time-based retention policy is shown as part of the DLM 200 for the tiered storage media 210-230, other retention policies, such as capacity-based, priority- or class-based and other retention policies may be used in combination or in place of the time-based retention policy. For example, other conditions may include at least one of the following: a current available capacity of a source data storage medium or a destination data storage medium, a business value of the corresponding data image, an age of the data image, and a size of the data image. Other conditions are possible and contemplated. Additionally, a recovery-chain-based retention policy may be used in DLM 200.

A data image may comprise at least one or more files of information, associated metadata, and associated storage arrangement information such as directories, folders, and subfolders. Data image 240 may be stored on a data storage medium 210. In one embodiment, data image 240 is initially stored on data storage medium 210 at time t1. In another embodiment, time t1 may be chosen as an initial point-in-time for lifecycle 100 although data image 240 has been stored on data storage medium 210 for a period of time prior to time t1.

In one embodiment, data storage medium 210 may be include one or more disk drives, such as HDDs, associated with a file system used for storing data generated by one or more client computers. A scheduled backup operation may create a copy of data image 240 to be stored on a separate storage medium, such as data storage medium 220. The data storage medium 220 may include relatively high-performance data storage, such as solid-state disks (SSDs) or other. Snapshot image 242 may represent a copy of data image 240. The one or more files in snapshot image 242 may comprise a different file format than a format used to store data image 240. The backup operation may be a predetermined scheduled event by an information technology (IT)

administrator. In one embodiment, data image 240 may be deleted, or expired, from data storage medium 210 after the snapshot image 242 is created. This deletion may occur immediately or a predetermined time after the snapshot creation according to a schedule by the IT administrator.

The process described above may be repeated for subsequent moves of the data image 240. Continuing with the flow of data illustrated in DLM 200, a predetermined subsequent duplication operation, which is shown as migration in FIG. 2, may move the snapshot image 242 from data storage medium 220 to data storage medium 230. The data storage medium 230 may represent target storage media, such as deduplication devices, tape storage, Cloud-based storage, or other. This subsequent duplication operation may occur a predetermined delay, which is shown as Delay1 in FIG. 2, after the completion of the initial backup operation. A copy of the data stored in snapshot image 242 is made and represented in FIG. 2 by duplicated image 244. As used herein, the terms "duplication" and "migration" refer to a copy operation that occurs after an initial backup operation of a data image, wherein the copy operation is performed on a snapshot image.

The migration that creates duplicated image 244 may be scheduled during a particular time window of availability. For example, the time window that occurs between time t3 and time t4 is a time window of availability for the migration. Similar to the deletion of data image 240, snapshot image 242 may be deleted, or expired, from data storage medium 220 after the duplicated image 244 is created. This deletion may occur immediately or a predetermined time after the creation of the duplicated image 244.

In the tiered storage of DLM 200, the data storage medium 220 may also be referred to as first tier 220 and the data storage medium 230 may also be referred to as second tier 230. The time-based retention policy may determine the snapshot image 242 on the first tier 220 qualifies for migration from the first tier 220 to the second tier 230. However, the recovery-chain-based retention policy for DLM 200 may prevent the migration.

The snapshot image 242 may correspond to a recovery chain and the recovery chain includes the snapshot image 242 and the further backup data that does not qualify for migration at the same time. For example, the recovery chain may include the snapshot image 242, which is includes full backup data, and data corresponding to at least one incremental backup operation. The incremental backup data may not yet qualify for migration based on the time-based retention policy. Therefore, the snapshot image 242 is maintained on the first tier 220. Accordingly, should a subsequent restore operation for any data in the recovery chain occur, the restore operation does not include the cost of a relatively higher latency and higher network bandwidth from accessing the second tier 230. Rather, the restore operation may access only the relatively high-performance first-tier 220 to complete.

Turning now to FIG. 3, one embodiment of a method 300 for defining retention and lifecycle policies for data backups is shown. For purposes of discussion, the steps in this embodiment are shown in sequential order. However, some steps may occur in a different order than shown, some steps may be performed concurrently, some steps may be combined with other steps, and some steps may be absent in another embodiment.

One of many examples of a retention policy may be used for determining when to migrate data from a first tier to a second tier of a multi-tiered storage system. For example, the retention policy may be based on one or more of time, data class, business value, capacity of a given data storage medium, size of data to migrate and so forth. In addition, a recovery-chain-based retention policy may be used as further described in the following description. If a time for migration of data according to a retention policy is reached (conditional block 302), then in block 304, data on the current tier is identified for possible migration to a next tier. The data may be identified based on the conditions for a retention policy such as time, business class, and so forth. In addition a user-specified indication may be used.

In block 306, a next tier for the identified data is identified. In various embodiments, the current tier is a first tier of the multi-tier storage system. The first tier may represent relatively high-performance data storage media storing critical and/or frequently accessed data. The next tier may be a second tier of the multi-tier storage system. The second tier may represent relatively low-performance data storage media for data less frequently accessed.

A recovery chain may include full backup data and at least one partial backup data. The recovery chain may be maintained on the first tier until it is expired due to a new full backup operation being performed and corresponding full backup data being stored on the first tier. The partial backup data within the recovery chain may be data corresponding to an incremental backup operation or a differential backup operation. If the identified data is not part of a current recovery chain (conditional block 308), then in block 310, the identified data is migrated to the next tier.

If the identified data is part of a current recovery chain (conditional block 308), then in block 312, the identified data and related data of the current recovery chain is maintained on the current tier is for a possible subsequent recovery or restore operation. In block 314, a copy of the identified data may be sent to the next tier.

Turning now to FIG. 4, a generalized block diagram of one embodiment of recovery chains stored on a data storage medium is shown. As shown, each of data storage media 410-420 send data to be backed up on data storage medium 430, which may represent a first tier of a multi-tier storage system. The data storage medium 440 may represent a second tier the multi-tier storage system. The first tier and the second tier may include the characteristics of the earlier descriptions. The data storage medium 430 may be referred to as the first tier 430 and the data storage medium 440 may be referred to as the second tier 440.

As shown, the first tier 430 stores one or more recovery chains at different points in time. At time t1, the first tier 430 includes completed full backup data labeled "Full1," completed full backup data labeled "Full 4," and first differential backup data labeled "Diff41." Accordingly, at time t1, the first tier 430 stores Chain1, which includes "Full1." Additionally, the first tier 430 stores Chain2, which includes "Full4+Diff41." The full backup data labeled "Full2" has not yet completed. As a new successful full backup has not yet been completed, neither of Chain1 or Chain2 qualifies to be migrated from the first tier 430 to the second tier 440.

At time t2, the first tier 430 further stores the full backup data labeled "Full2," first incremental backup data for "Full2" labeled "Inc21," and second differential backup data labeled "Diff42." The incremental backup data labeled "Inc22" and the full backup data labeled "Full5" have not yet completed. At time t2, the first tier 430 further stores Chain3, which includes "Full2+Inc21." Additionally, the first tier 430 stores Chain2, which includes "Full4+Diff42." As the differential backup data "Diff42" replaces the differential backup data "Diff41," Chain2 is modified. At time t2, the Chain1 qualifies by the recovery-chain-based retention policy to migrate from the first tier 430 to the second tier 440. However, each of Chain2 and Chain3 do not qualify based on recovery-chain-based retention policy to migrate.

At time t3, the first tier 430 further stores the second incremental backup data for "Full2" labeled "Inc22," third incremental backup data for "Full2" labeled "Inc23," and full backup data labeled "Full5." The incremental backup data labeled "Inc23" has not yet completed. At time t3, the first tier 430 further stores Chain3, which is modified to include "Full2+Inc21+Inc22." Additionally, the first tier 430 stores Chain4, which includes "Full5." At time t3, the Chain2 qualifies by the recovery-chain-based retention policy to migrate from the first tier 430 to the second tier 440. However, each of Chain3 and Chain4 does not qualify based on recovery-chain-based retention policy to migrate.

At time t4, the first tier 430 further stores the third incremental backup data for "Full2" labeled "Inc23," and the full backup data labeled "Full3." The incremental backup data labeled "Inc31" has not yet completed. At time t4, the first tier 430 further stores Chain3, which is modified to include "Full2+Inc21+Inc22+Inc23." Additionally, the first tier 430 stores Chain5, which includes "Full3." At time t4, the Chain3 qualifies by the recovery-chain-based retention policy to migrate from the first tier 430 to the second tier 440. However, each of Chain4 and Chain5 does not qualify based on recovery-chain-based retention policy to migrate.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for managing data as part of a lifecycle policy for each of one or more data images, the method comprising:
   identifying first backup data that is qualified to migrate from a first tier to a second tier of a multi-tier storage system based on a time-based retention policy;
   responsive to determining the first backup data corresponds to a recovery chain stored on the first tier, wherein the recovery chain comprises at least one full backup data:
      preventing migration of the first backup data on the first tier, responsive to determining:
         the recovery chain is not expired; and
         the recovery chain includes at least a second backup data that is not qualified to migrate from the first tier to the second tier based on the time-based retention policy; and
      migrating the first backup data from the first tier to the second tier, responsive to determining the recovery chain is expired, wherein determining the recovery chain is expired comprises determining a new full backup operation has been performed and corresponding new full backup data is stored on the first tier.

2. The method as recited in claim 1, wherein the recovery chain further comprises at least one partial backup data corresponding to the full backup data.

3. The method as recited in claim 2, wherein the at least one partial backup data is one of incremental backup data and differential backup data.

4. The method as recited in claim 2, wherein in response to determining a point in time for migrating backup data based on the time-based retention policy is reached, the method further comprises creating a new recovery chain comprising the new full backup data and any completed partial backup data corresponding to the new full backup data.

5. The method as recited in claim 1, wherein responsive to determining the recovery chain is not expired and the recovery chain includes at least a second backup data that is not qualified to migrate from the first tier to the second tier based on the time-based retention policy, the method further comprises sending a copy of the first backup data to the second tier.

6. The method as recited in claim 1, wherein preventing migration of the first backup data on the first tier comprises sending a copy of the first backup data to the second tier while maintaining a copy of the first backup data on the first tier.

7. A computing system comprising:
   a media server;
   a network; and
   one or more client computers coupled to the media server via the network, each configured to generate data for one or more data images to be backed up in a multi-tier storage system;
   wherein the media server is configured to:
      identify first backup data that is qualified to migrate from a first tier to a second tier of the multi-tier storage system based on a time-based retention policy;
      responsive to determining the first backup data corresponds to a recovery chain stored on the first tier, wherein the recovery chain comprises at least one full backup data:
         prevent migration of the first backup data on the first tier,
         responsive to determining:
            the recovery chain is not expired; and
            the recovery chain includes at least a second backup data that is not qualified to migrate from the first tier to the second tier based on the time-based retention policy; and
         migrate the first backup data from the first tier to the second tier, responsive to determining the recovery chain is expired, wherein determining the recovery chain is expired comprises determining a new full backup operation has been performed and corresponding new full backup data is stored on the first tier.

8. The computing system as recited in claim 7, wherein the recovery chain further comprises at least one partial backup data corresponding to the full backup data.

9. The computing system as recited in claim 8, wherein the at least one partial backup data is one of incremental backup data and differential backup data.

10. The computing system as recited in claim 8, wherein in response to determining a point in time for migrating backup data based on the time-based retention policy is reached, the media server is further configured to create a new recovery chain comprising the new full backup data and any completed partial backup data corresponding to the new full backup data.

11. The computing system as recited in claim 7, wherein responsive to determining the recovery chain is not expired and the recovery chain includes at least a second backup data that is not qualified to migrate from the first tier to the second tier based on the time-based retention policy, the media server is further configured to send a copy of the first backup data to the second tier.

12. The computing system as recited in claim 7, wherein to prevent migration of the first backup data on the first tier, the media server is further configured to send a copy of the first backup data to the second tier while maintaining a copy of the first backup data on the first tier.

13. A non-transitory computer-readable storage medium storing program instructions for defining a lifecycle policy for each of one or more data images, wherein the program instructions are executable by the processor to:
 identify first backup data that is qualified to migrate from a first tier to a second tier of a multi-tier storage system based on a time-based retention policy;
 responsive to determining the first backup data corresponds to a recovery chain stored on the first tier wherein the recovery chain comprises at least one full backup data:
  prevent migration of the first backup data on the first tier, responsive to determining:
   the recovery chain is not expired; and
   the recovery chain includes at least a second backup data that is not qualified to migrate from the first tier to the second tier based on the time-based retention policy; and
  migrate the first backup data from the first tier to the second tier, responsive to determining the recovery chain is expired, wherein determining the recovery chain is expired comprises determining a new full backup operation has been performed and corresponding new full backup data is stored on the first tier.

14. The non-transitory computer readable storage medium as recited in claim 13, wherein responsive to determining the recovery chain is not expired and the recovery chain includes at least a second backup data that is not qualified to migrate from the first tier to the second tier based on the time-based retention policy, the program instructions are further executable to send a copy of the first backup data to the second tier.

* * * * *